Figure 1:
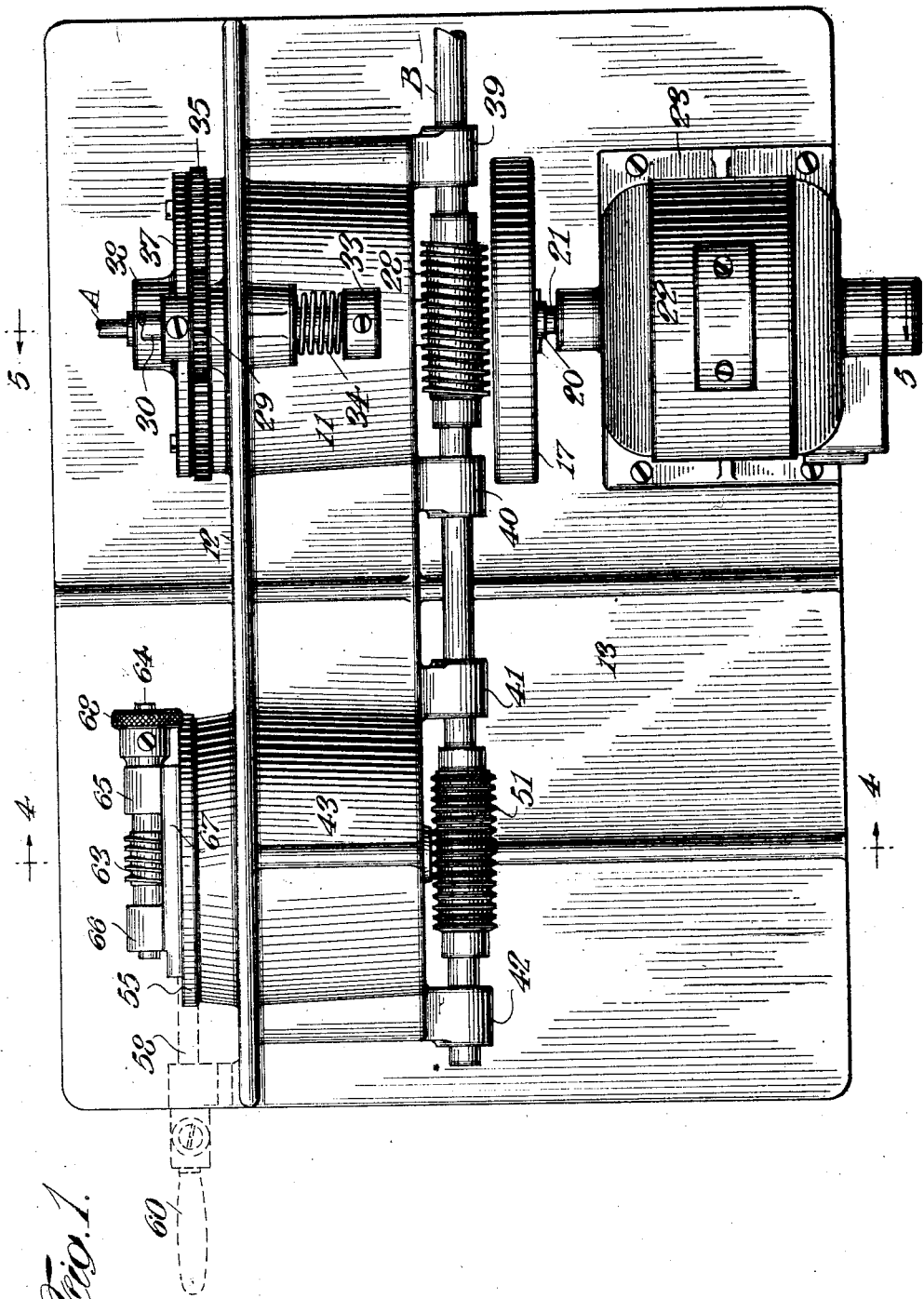

June 2, 1931. A. DINA 1,808,454
MECHANICAL MOVEMENT
Filed March 1, 1930 5 Sheets-Sheet 1

INVENTOR
Augusto Dina
BY
Howard W. Dix
ATTORNEY

June 2, 1931.  A. DINA  1,808,454
MECHANICAL MOVEMENT
Filed March 1, 1930   5 Sheets-Sheet 3

INVENTOR
Augusto Dina
BY
Howard W. Dix
ATTORNEY

June 2, 1931.   A. DINA   1,808,454
MECHANICAL MOVEMENT
Filed March 1, 1930   5 Sheets-Sheet 5

INVENTOR
Augusto Dina
BY
Howard W. Dix
ATTORNEY

Patented June 2, 1931

1,808,454

UNITED STATES PATENT OFFICE

AUGUSTO DINA, OF ELIZABETH, NEW JERSEY, ASSIGNOR TO INTERNATIONAL PROJECTOR CORPORATION, OF NEW YORK, N. Y., A CORPORATION OF DELAWARE

MECHANICAL MOVEMENT

Application filed March 1, 1930. Serial No. 432,311.

This invention relates to a novel mechanical movement of few parts or elements. One of the main features of the invention is the flexibility of adjustment of parts of the movement in respect to some object or factor outside of the movement and to accomplish this desirable result without varying the relative cyclic relation of certain parts of the movement.

A main object of the invention is to change the relation of a load shaft in a mechanical movement with respect to outside factors without affecting the relative cyclic position of that shaft with respect to other elements within the movement or system and especially without affecting its relation to another shaft within the system.

A further object of the invention is to achieve the above object with the use of a minimum of mechanism and the employment of only the simplest elements to achieve the desired results.

A further object is to so arrange and construct the apparatus that the adjustments and changes may take place if desired even while the mechanism is running and with the minimum of effort on the part of the operator.

Further and more specific objects, features, and advantages will more clearly appear from the detailed description given below when taken in connection with the accompanying drawings which form part of the invention and specification and which illustrate one present preferred form of the invention.

The invention in broad conception is related to the invention set forth in my copending application Serial Nos. 380,834 and 389,837 filed respectively Jan. 25, 1929 and Aug. 31, 1929.

The invention herein in its general form preferably comprises a mechanical system in which are two load shafts. The necessities of the system herein are such that it very often becomes desirable to change the position of one load shaft without affecting its relation to the other parts of the system and especially without changing its relation in the operating cycle with respect to the other load shaft. To accomplish this end successfully requires special mechanism of which the hereinafter described mechanism is a preferred form developed after much research and trial to produce a simple and readily operated device.

To effect the desired result, the support for the load shaft to be changed is mounted in a casing which is rotated around an axis which coincides with the axis of the aforesaid load shaft. In the case, for instance, of an intermittent movement, this involves the rotation of a casing or box around the axis of the intermittent and thus revolves the pin wheel shaft around the axis of the intermittent.

A portion of this casing which is rotated about the above mentioned axis is directly connected to an exactly similar casing by a simple bar connection and the ends of the connecting bar are fastened to exactly corresponding portions of the two casings. The second load shaft is preferably driven through the intermediary of a worm thereon meshing with a gear on the first casing in line with the axis of rotation of the first casing and this gear is driven from a gear on the pin wheel shaft which is driven in any suitable manner from any desired motor.

This load shaft is also provided with a rack on another portion thereof adjacent the second casing and this rack is engaged by a gear also in line with the axis of rotation of the second casing which gear is meshed with a gear on the second casing exactly similar to the gear on the first casing which is driven from the source of power.

Preferably the connecting bar between the two casings is connected between the two gears last mentioned. Suitable mechanism is provided to adjust either casing and in so doing the both casings are similarly adjusted and the rack movement associated with the second load shaft in its connection with the second casing, controls the character of movement of the said shaft so that the desired adjustments may take place without longitudinally or angularly moving this second load shaft.

Figure 2:
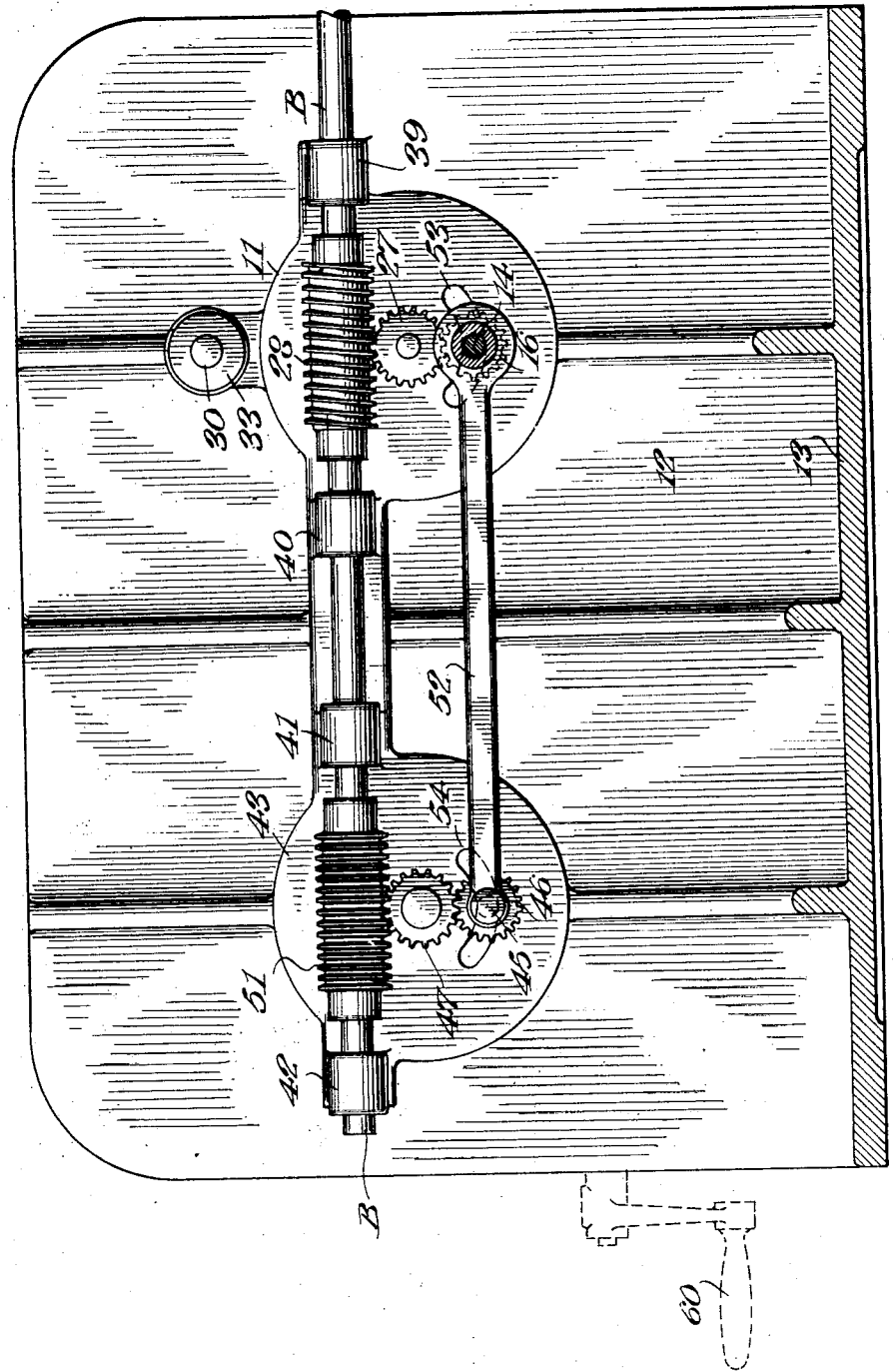
Figure 3:
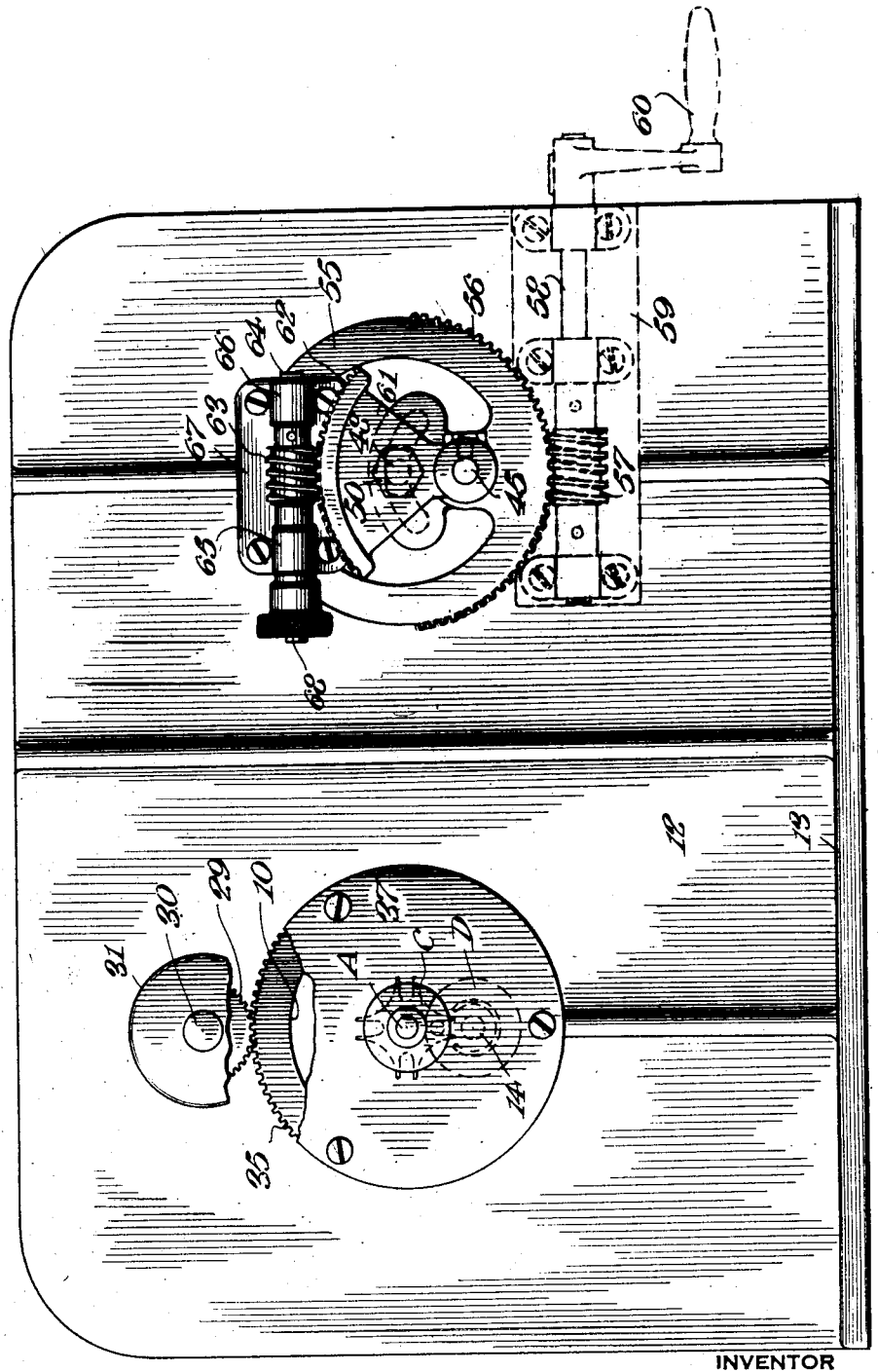
Figure 4:
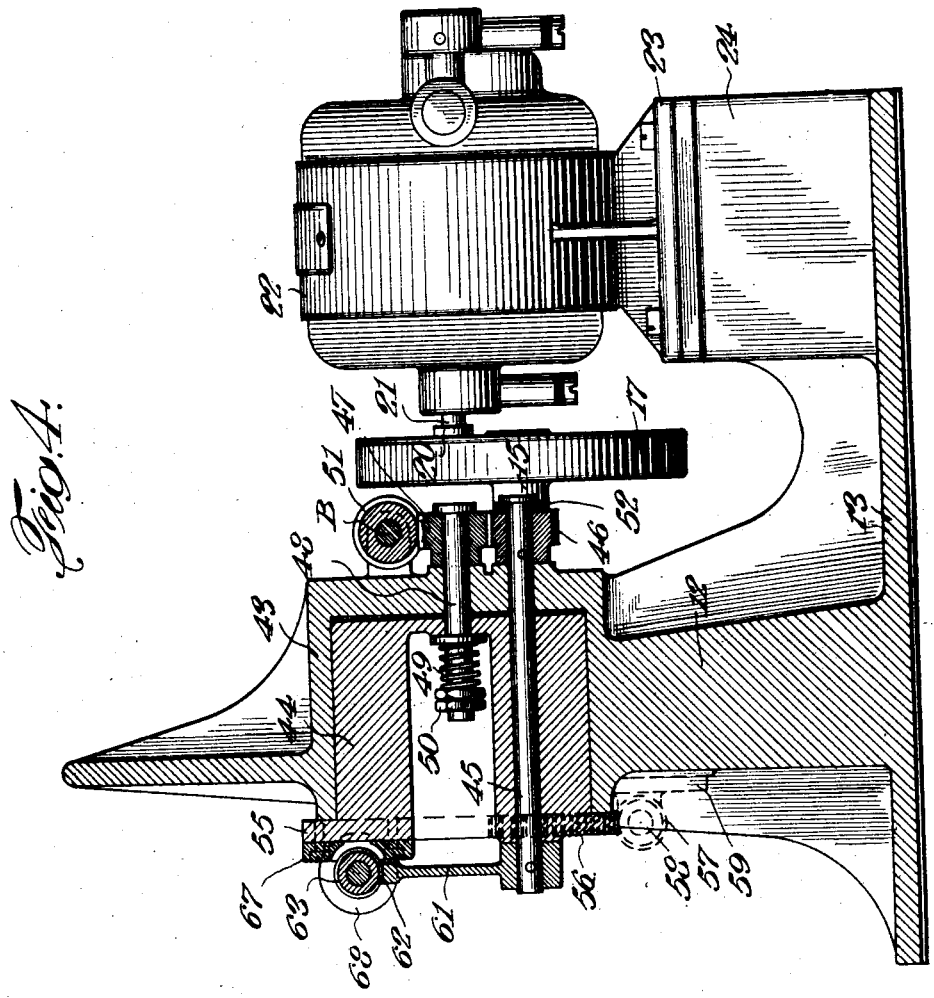
Figure 5:
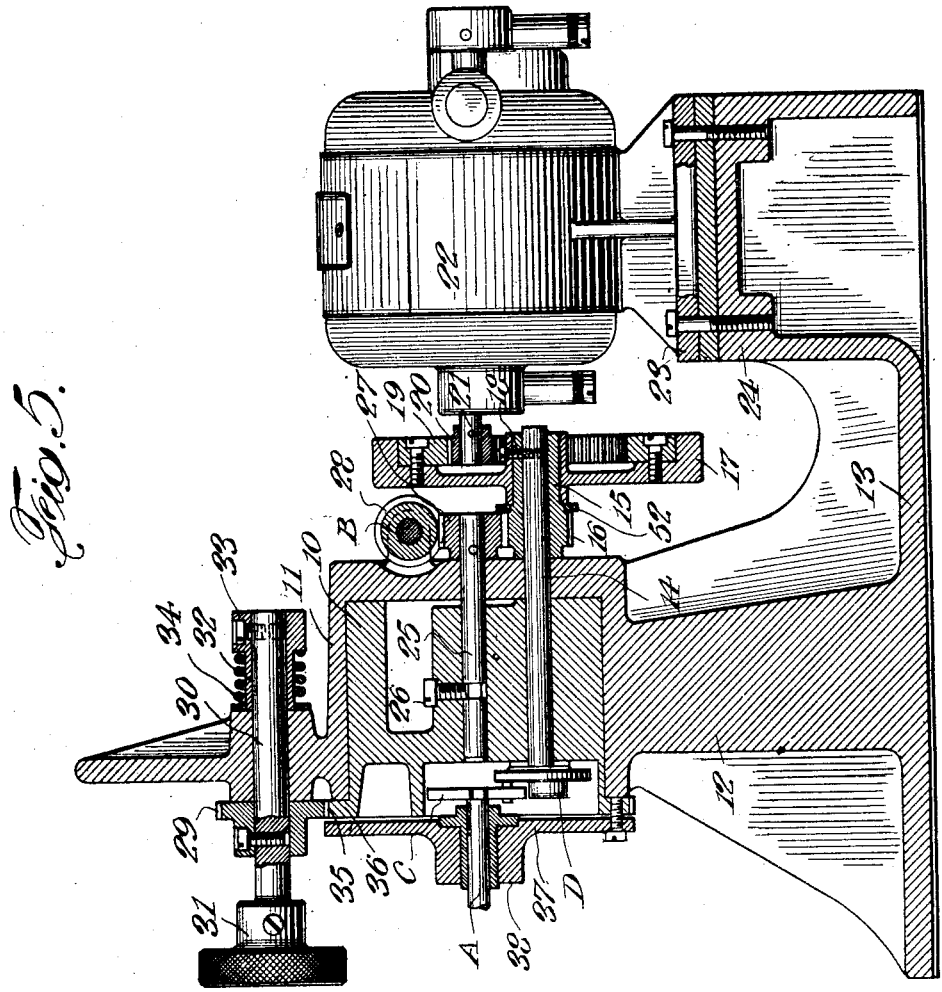

The present preferred form of the invention is shown in the drawings, in which,

Fig. 1 is a plan view of the device;
Fig. 2 is a front elevation of the device;
Fig. 3 is a rear elevation of the device;
Fig. 4 is a transverse vertical section taken on the line 4—4 of Fig. 1; and,
Fig. 5 is a transverse vertical section taken on the line 5—5 of Fig. 1.

As shown in the drawings, the mechanism is designed to permit the adjustment of a load shaft A with respect to extra-system conditions without changing the inter-system conditions which exist between it and a second load shaft B or between it and interconnecting mechanism such as the star wheel C and the pin wheel D of a Geneva movement or the like. Thus it is possible to maintain the cyclic relations between the latter two elements constant at all times even when the extra-system relations are being changed. The mounting of the load shaft A and its connected mechanism permits its ready adjustment with respect to extra-system conditions. The mounting includes a chambered casing 10 preferably circular in form and disposed within a bearing chamber or journal 11 mounted on a vertical pedestal wall 12 associated with a base 13.

This casing 10 supports the shaft 14 which is rotatable therein. This shaft 14 supports at one end, within the casing, the pin wheel D and on the other end outside the casing 10, supports a sleeve 15 on which there may integrally be formed a gear 16. Also on the sleeve 15 is disposed a fly wheel 17. A set screw 18 fastens the fly wheel and the sleeve 15 to the shaft 14. The fly wheel 17 is preferably provided with an internal ring gear 19 with which meshes a pinion 20 on the shaft 21 of the drive motor 22 which in turn is mounted on a base 23 fastened to the platform 24 on the base 13. It will be noticed that the motor shaft 21 is alined with the load shaft A. The gears 19 and 20 may be replaced with other types of power transmission if desired.

Disposed centrally within the chambered casing 10 and in line with the axes of the shafts A and 21, is a shaft 25 held from longitudinal movement by means of a set screw 26 but otherwise freely rotatable within the casing 10 and carrying on its other end a worm gear 27 adapted to mesh with a worm 28 on the load shaft B.

The casing 10 is adapted to be rotated by reason of the pinion 29 keyed to the shaft 30 and operated by any suitable means such as the hand knob 31. This shaft 30 is journalled in the upper portion of the partition or wall 12 and on the end opposite the knob 31 there is provided a sleeve 32 having a head 33 which is keyed to the shaft 30. A spring 34 extends between the head 33 and the wall 12 and tends to keep the shaft 30 to the right and the gear 29 in mesh with teeth 35 on the flange 36 on the face of the casing 10. A cap plate 37 is fastened to the face of the casing 10 and has a hub 38 acting as a journal for the load shaft A.

It will be seen from Fig. 1, that the load shaft B is journalled in bearing members 39, 40, 41, and 42 disposed on the face of the wall 12 and is freely disposed therein. It is this shaft with which it is desired to maintain substantially constant inter-system relations, even while the position of the load shaft A is being changed with respect to outside factors.

Disposed on the wall 12 and adjacent the bearing chamber 11, there is another bearing chamber 43 within which is disposed the rotatable casing 44 which is also chambered. This casing 44 is rotatable within the bearing casing 43 and supports a shaft 45 rotatably therein. On one end outside the casing, this shaft 45 supports a gear 46 fixed thereto and meshing with a gear 47 on a shaft 48 the inner end of which extends within the casing 44 and is engaged by a spring 49 bearing against a nut or nuts 50 on the end of the shaft 48 and against the inner wall of the casing at the other end. This spring tends to maintain the mesh of the gears 46 and 47. The gear 47 meshes with a straight rack element 51 disposed on the load shaft B.

It will be seen in Figs. 2, 4, and 5, that there is a link bar 52 which at its ends is provided with suitable apertures to embrace the shaft 45 at one end and the sleeve 15 at the other end. It is therefore evident that whenever the casing 10 is rotated by the manipulation of the knob 31, the sleeve 15 will be oscillated or revolved around the center of the casing 10 and will cause the link 52 to oscillate and rotate the casing 44 which acts as a journal for the shaft 45. This is also possible by reason of the fact that the front walls of the casings, such as 11 and 43, are provided with slots 53 and 54 to permit this rotation of the casings 10 and 44 with these above mentioned shafts.

It will be seen from an examination of Figs. 3 and 4 that the rear face of the casing 44 is provided with a flange 55 the lower portion of which is provided with teeth 56 adapted to mesh with a worm gear 57 on a shaft 58 journalled on a plate 59 fastened to the rear of partition or wall 12. The shaft is provided with a handle 60 so that the teeth 56 can be rotated and with them the casing 44. This provides an alternate means whereby the casing 44 can be moved and through the connecting bar 52 permit of the adjustment of the casing 10 in which is disposed the intermittent mechanism known as the Geneva movement. Because it is only an alternate adjustment, this mechanism is shown in dotted lines. When the adjustment is made through the handle or knob 31, then the handle 60 and its associated parts are not employed.

In order to permit the separate and independent adjustment of the shaft 45 with respect to the casing 44, without moving said casing, the rear end of the shaft 45 has connected thereto a sectoral shaped plate 61 the outer edge of which is arcuate and provided with teeth 62 adapted to mesh with a worm 63 on a shaft 64 journalled at 65 and 66 on a plate 67 fastened to the wall 12 and operated by the knob 68. Thus it will be seen that the shaft 45 is immovable except through the actuation of the knob 68 and as far as concerns a rotation on its own axis. It will be seen that when the casing 44 is rotated around its own axis, the shaft 45 will revolve around the center of the casing 44 as part of the unit. Therefore, except when actuated by the knob 68, the shaft 45 is fixed within the casing 44 and moves solidly therewith.

In the operation of this improved device, it is assumed that the motor is running and driving the flywheel 17 mounted on the pin wheel shaft 14. Thus the intermittent mechanism is operated in the usual manner to turn the load shaft A. At the same time, the load shaft B rotates through the intermediary of the gear 16, 27, and worm 28. As shaft B rotates, it is apparent that the rack or straight worm 51 will turn but since it is a plain rack, it will not cause any tendency to rotate the gear 47 and its associated parts.

It will be assumed that it is desired to change the position of the load shaft A such as to change its position with respect to outside factors. To do this the knob 31 or the handle 60 are turned. One or the other will be employed but not both. If the knob 31 is operated, then it will act through the teeth 35 to turn the casing 10 around its axis and this will cause the shifting of the pin wheel shaft 14 around the axis of the load shaft A even while running. As the shaft 14 is thus moved, the connecting bar 52 will also be laterally moved and will cause a corresponding rotation of the casing 44 about its axis. Since the gears 46 and 16, 47 and 27, are of equal diameter and radius from the center of the axes of the casings 10 and 44, and since the gear 46 is fixed in position as respects the casing 44, the effect of this movement of the casing 44 by the bar 52 will be to cause the gear 46 to roll on the surface of the gear 47 and therefore will cause no appreciable shifting of the shaft B and will not tend to cause any turning of it due to this adjustment of the two casings. Since the rack 51 is on the same shaft as the worm 28, the governed action of the shaft B through the control thereon of the gears 46, 47, and worm 51, will tend to offset any turning or shifting action of the shaft due to the alteration of the position of the gears 16 and 27 with respect to the worm 28. If this adjustment is effected through the intermediary of the knob or handle 60, then the casing 44 is adjusted and through the bar 52 the casing 10 follows.

For the independent adjustment of the shaft B and to turn it in a calculated manner independently of the position of the casings 10 and 44, the knob 68 can be manipulated and through the driving action of the gear 48 on the rack 51 through the gear 47, will adjust the shaft B, and as it is adjusted longitudinally, the worm 28 will be advanced or moved back along the gear 27 and cause the shaft B to turn a proportionate amount.

Thus there is provided a simple, efficient, and effective device, whereby one load shaft may be altered with regards to its position relative to outside factors, without altering in any way the position of another load shaft such as the shaft B. Thus the shaft A may be independently adjusted without altering the longitudinal or angular position of the load shaft B. These adjustments are easily and simply made and with the minimum of mechanism necessary to accomplish the desired results.

While the invention has been described in detail and with respect to a present preferred form thereof, it is not to be limited to such details and forms since many changes and modifications may be made and the invention embodied in other forms without departing from the spirit and scope of the invention in its broadest aspects. Hence it is desired to cover any and all forms and modifications which may come within the language or scope of any one or more of the appended claims.

What is claimed, is:

1. A mechanical movement comprising a pair of rotatable casings, a load shaft supported on one of said casings in line with the axis of rotation thereof, a connection between the casings whereby the movement of one will move the other correspondingly, a second load shaft, means on the first casing connected to the second load shaft to drive the same, and means on the second casing engaging the second load shaft to control the movement of the second load shaft as the casings are moved.

2. A mechanical movement comprising a pair of rotatable casings, a load shaft supported on one of said casings in line with the axis of rotation thereof, means on one of said casings for driving the load shaft, a connection between the casings whereby the movement of one will move the other correspondingly, a second load shaft, means on the one casing to drive the second load shaft, and means on the other casing to control the movement of the second load shaft as the casings are moved to adjust the first load shaft without altering the position or adjustment of the second load shaft.

3. A mechanical movement comprising a casing rotatable about a given axis, a load shaft supported therein about said axis, a shaft in said casing off center therein and adapted to drive the load shaft, a second load shaft, a gear on the drive shaft, an idler gear on the casing in line with the axis of rotation thereof, and meshing with the drive gear, a worm on the second load shaft engaging the idler gear, a second casing rotatable about an axis, a fixed gear thereon at the same distance from the center of rotation as the drive gear is from the center of rotation of the first casing, an idler gear in line with the axis of rotation of the second casing and supported therefrom, and a rack control member on the second load shaft meshing with the last mentioned idler gear, and a bar connecting the shafts of the drive gear and the fixed gear on the second casing.

4. A mechanical movement comprising a casing rotatable about a given axis, a load shaft supported therein about said axis, a shaft in said casing off center therein and adapted to drive the load shaft, a second load shaft, a gear on the drive shaft, an idler gear on the casing in line with the axis of rotation thereof, and meshing with the drive gear, a worm on the second load shaft engaging with the idler gear, a second casing rotatable about an axis, a fixed gear thereon at the same distance from the center of rotation as the drive gear is from the center of rotation of the first casing, an idler gear in line with the axis of rotation of the second casing and supported therefrom, and a rack control member on the second load shaft meshing with the last mentioned idler gear, a bar connecting the shafts of the drive gear and the fixed gear on the second casing, and means on the second casing to adjust the fixed gear to move it independently of any movement of the supporting casing thereof.

5. A mechanical movement comprising a casing rotatable about a given axis, a load shaft supported therein about said axis, a shaft in said casing off center therein and adapted to drive the load shaft, a second load shaft, a gear on the drive shaft, an idler gear on the casing in line with the axis of rotation thereof, and meshing with the drive gear, a worm on the second load shaft engaging with the idler gear, a second casing rotatable about an axis, a fixed gear thereon at the same distance from the center of rotation as the drive gear is from the center of rotation of the first casing, an idler gear in line with the axis of rotation of the second casing, and supported therefrom, a rack control member on the second load shaft meshing with the last mentioned idler gear, a bar connecting the shafts of the drive gear and the fixed gear on the second casing, and means connected to one of said casings to rotate it and the other casing about their respective axes.

6. A mechanical movement comprising a casing rotatable about a given axis, a load shaft supported therein about said axis, a shaft in said casing off center therein and adapted to drive the load shaft, a second load shaft, a gear on the drive shaft, an idler gear on the first casing in line with the axis of rotation thereof, and meshing with the drive gear, a worm on the second load shaft engaging with the idler gear, a second casing rotatable about an axis, a fixed gear thereon at the same distance from the center of rotation as the drive gear is from the center of rotation of the first casing, an idler gear in line with the axis of rotation of the second casing and supported therefrom, a rack control member on the second load shaft meshing with the last mentioned idler gear, a bar connecting the shafts of the drive gear and the fixed gear on the second casing, and means connected to one of said casings to rotate it and the other casing about their respective axes, and means on the second casing to adjust the fixed gear to move it independently of any movement of the supporting casing thereof.

7. A mechanical movement comprising a rotatable casing, a load shaft disposed and supported in the casing in line with the axis of rotation thereof, a drive shaft on the casing disposed off center from the axis of rotation of said casing, means connecting with the drive shaft to drive the load shaft, a second load shaft, means connecting the second load with the drive shaft to drive the same, a second casing rotatably disposed adjacent the first casing, a fixed gear therein off center the same distance as the drive shaft is off center on the first casing, a single bar connecting the drive shaft on the first casing with the shaft of the fixed gear on the second casing, and control mechanism connecting the fixed gear with the second load shaft.

8. A mechanical movement comprising a rotatable casing, a load shaft disposed and supported in the casing in line with the axis of rotation thereof, a drive shaft on the casing disposed off center from the axis of rotation of said casing, means connecting the drive and load shafts to drive the latter, a second load shaft, means connecting the second load shaft with the drive shaft to drive the same, a second casing rotatably disposed adjacent the first casing, a fixed gear therein off center the same distance as the drive shaft is off center on the first casing, a single bar connecting the drive shaft on the first casing with the shaft of the fixed gear on the second casing, control mechanism connecting the fixed gear with the second load shaft, and means for moving one of the casings to alter the position of the first load shaft with respect to conditions outside the system.

9. A mechanical movement comprising a rotatable casing, a load shaft supported and disposed in the casing and in line with the axis of rotation thereof, a drive shaft on the casing disposed off center from the axis of rotation of said casing, means connecting the drive and the load shafts to drive the latter, a second load shaft, means connecting the second load shaft with the drive shaft to drive the same, a second casing rotatably disposed adjacent the first casing, a fixed gear therein off center the same distance as the drive shaft is off center on the first casing, a single bar connecting the drive shaft on the first casing with the shaft of the fixed gear on the second casing, control mechanism connecting the fixed gear with the second load shaft, means for moving one of said casings to alter to the position of the first load shaft with respect to conditions outside the system, and means on the second casing to rotate the fixed gear independent of any movement of the second casing.

10. A mechanical movement comprising a rotatable casing, a drive shaft therein, off center with respect to the axis of rotation of the casing, a gear on the drive shaft, an idler gear on the casing meshing with the drive gear, said idler gear being in line with the axis of rotation of the casing, a load shaft, a worm thereon meshing with the idler gear, a second rotatable casing, a fixed gear thereon off center the same distance as the drive shaft on the first casing, control gearing on the second casing connecting the fixed gear with the load shaft to control the movement as the casings are moved, and a bar connecting the drive shaft with the axis of the fixed gear.

11. A mechanical movement comprising a rotatable casing, a drive shaft therein off center with respect to the axis of rotation of the casing, a gear on the drive shaft, an idler gear on the casing meshing with the drive gear, said idler gear being in line with the axis of rotation of the casing, a load shaft, a worm thereon meshing with the idler gear, a second rotatable casing, a fixed gear thereon off center the same distance as the drive shaft on the first casing, an idler gear on the second casing in line with the axis of rotation thereof, a rack element on the load shaft meshing with the idler gear, said fixed gear meshing with the idler gear, and a bar connecting the drive shaft with the axis of the fixed gear.

12. A mechanical movement comprising a rotatable casing, a drive shaft therein, off center with respect to the axis of rotation of said casing, a gear on the drive shaft, an idler gear on the casing meshing with the drive gear, said idler gear being in line with the axis of rotation of the casing, a load shaft, a worm thereon meshing with the idler gear, a second rotatable casing, a fixed gear thereon off center the same distance as the drive shaft on the first casing, an idler gear on the second casing in line with the axis of rotation thereof, a rack element on the load shaft meshing with the idler gear on the second casing, said fixed gear meshing with the idler, and means on the second casing to rotate the fixed gear independently of any movement of the second casing.

13. A mechanical movement comprising a rotatable casing, a drive shaft therein, off center with respect to the axis of rotation of said casing, a gear on the drive shaft, an idler gear on the casing meshing with the drive gear, said idler gear being in line with the axis of rotation of the casing, a load shaft, a worm thereon meshing with the idler gear, a second rotatable casing, a fixed gear thereon off center the same distance as the drive shaft on the first casing, an idler gear on the second casing in line with the axis of rotation thereof, a rack element on the load shaft meshing with the idler gear on the second casing, said fixed gear meshing with the idler gear, means on the second casing to rotate the fixed gear independently of any movement of the second casing, means to move one of the casings around its axis, and a bar connecting the drive shaft with the axis of the fixed gear.

AUGUSTO DINA.